United States Patent
Yun et al.

(10) Patent No.: US 10,862,135 B2
(45) Date of Patent: Dec. 8, 2020

(54) METHOD OF MANUFACTURING ELECTROLYTE MEMBRANE FOR FUEL CELLS AND METHOD OF MANUFACTURING MEMBRANE-ELECTRODE ASSEMBLY INCLUDING THE SAME

(71) Applicants: Hyundai Motor Company, Seoul (KR); Kia Motors Corporation, Seoul (KR)

(72) Inventors: Sukhwan Yun, Gyeonggi-do (KR); Bo Ki Hong, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 75 days.

(21) Appl. No.: 16/124,933

(22) Filed: Sep. 7, 2018

(65) Prior Publication Data

US 2019/0207226 A1    Jul. 4, 2019

(30) Foreign Application Priority Data

Dec. 28, 2017   (KR) .................. 10-2017-0182226

(51) Int. Cl.
| | | |
|---|---|---|
| *H01M 4/88* | (2006.01) | |
| *H01M 4/86* | (2006.01) | |
| *H01M 8/023* | (2016.01) | |
| *H01M 8/04291* | (2016.01) | |
| *H01M 8/04492* | (2016.01) | |
| *H01M 8/1023* | (2016.01) | |
| *H01M 8/1039* | (2016.01) | |
| *H01M 8/1051* | (2016.01) | |
| *H01M 8/1086* | (2016.01) | |
| *H01M 8/1018* | (2016.01) | |

(52) U.S. Cl.
CPC ........ *H01M 4/881* (2013.01); *H01M 4/8605* (2013.01); *H01M 4/8663* (2013.01); *H01M 8/023* (2013.01); *H01M 8/04291* (2013.01); *H01M 8/04507* (2013.01); *H01M 8/1023* (2013.01); *H01M 8/1039* (2013.01); *H01M 8/1051* (2013.01); *H01M 8/1086* (2013.01); *H01M 2008/1095* (2013.01)

(58) Field of Classification Search
CPC ..................... H01M 4/881; H01M 2008/1095
USPC ...................................................... 429/214
See application file for complete search history.

(56) References Cited

U.S. PATENT DOCUMENTS

2011/0262832 A1* 10/2011 Endoh .................. C08J 5/2237
                                                              429/480

FOREIGN PATENT DOCUMENTS

| KR | 10-0970358 B1 | 7/2010 |
| KR | 10-0971640 B1 | 7/2010 |

* cited by examiner

*Primary Examiner* — Brian R Ohara
(74) *Attorney, Agent, or Firm* — Mintz Levin Cohn Ferris Glovsky and Popeo, P.C.; Peter F. Corless

(57) ABSTRACT

The present invention relates to a method of manufacturing an electrolyte membrane for fuel cells by transferring antioxidants to the electrolyte membrane. The method may include providing a first membrane including a perfluorinated sulfonic acid-based compound, providing a second membrane including an antioxidant such that the second membrane partially or entirely contacts a surface of the first membrane, transferring or moving the antioxidant of the second membrane to the first membrane, and removing the second membrane.

19 Claims, 4 Drawing Sheets

METHOD OF MANUFACTURING ELECTROLYTE MEMBRANE FOR FUEL CELLS AND METHOD OF MANUFACTURING MEMBRANE-ELECTRODE ASSEMBLY INCLUDING THE SAME

CROSS-REFERENCE TO RELATED APPLICATION

This application claims, under 35 U.S.C. § 119(a), the benefit of priority to Korean Patent Application No. 10-2017-0182226 filed on Dec. 28, 2017, the entire contents of which are incorporated herein by reference.

TECHNICAL FIELD

The present invention relates to a method of manufacturing an electrolyte membrane for fuel cells and a method of manufacturing a membrane-electrode assembly including the same. The method may include moving or transferring antioxidants to the electrolyte membrane.

BACKGROUND

Generally, polymer electrolyte membrane fuel cells (PEMFCs) have been applied in vehicles. For example, in order for PEMFCs to normally generate a high power of at least several tens of kW or greater, they should stably operate within a wide current density range.

The electrochemical reaction to generate electricity by fuel cells occurs in a membrane-electrode assembly (MEA) which includes a perfluorinated sulfonic acid ionomer-based membrane and a pair of electrodes (an anode and a cathode).

Hydrogen supplied to an anode, which is an oxidation electrode for fuel cells, is split into a proton and an electron, and then the proton is moved through the membrane to a reduction electrode, which is a cathode, and the electron is moved via an exterior circuit to the cathode. Then, at the cathode, an oxygen molecule, the proton and the electron react together, to produce electricity and heat, and at the same time, water ($H_2O$) as a by-product.

The water produced during electrochemical reaction in the fuel cell advantageously functions to maintain humidity of the membrane-electrode assembly when present in an appropriate amount. However, when excess water is present, flooding occurs at a high current density. The flooded water interferes with efficient supply of reaction gases into the fuel cell, thus causing serious voltage loss.

In the electrochemical reaction of fuel cells, when protons at the anode are moved through the membrane to the cathode, they are combined with water molecules in the form of hydronium ions such as $H_3O^+$ and drag the water molecules, which is "electro-osmotic drag (EOD)". In addition, as the amount of water accumulated in the cathode increases, a part of water is reversely moved from the cathode to the anode, which is referred to as "back diffusion" (BD). Accordingly, in order to obtain excellent cell performance in the fuel cell, these water movement phenomena should be clearly understood and water in the fuel cell should be efficiently used.

In general, hydrogen and oxygen in the air, which are reactant gases for fuel cells, crossover through the electrolyte membrane to facilitate production of hydrogen peroxide (H—O—O—H). The hydrogen peroxide produces oxygen-containing radicals such as a hydroxyl radical (—OH) and a hydroperoxyl radical (—OOH).

The radicals attack the perfluorinated sulfonic acid-based electrolyte membrane, to induce chemical degradation of the membrane, which eventually has a negative impact of reducing durability of fuel cells.

As a conventional technology to mitigate such chemical degradation of the electrolyte membrane, addition of various kinds of antioxidants to the electrolyte membrane has been suggested.

The antioxidant includes a primary antioxidant functioning as a radical scavenger, a secondary antioxidant functioning as a hydrogen peroxide decomposer or the like. Examples of the primary antioxidant include cerium-based antioxidants such as cerium oxide and cerium (III) nitrate hexahydrate antioxidants, terephthalate-based antioxidants and the like. The secondary antioxidants include manganese-based antioxidants such as manganese oxide antioxidants.

In the related field, a method including impregnating a fluorine-based electrolyte membrane in an aqueous solution containing a cerium ion and introducing the solution into the electrolyte membrane through ion exchange has been introduced. In addition, a method of manufacturing a cerium-including electrolyte membrane using a liquid dispersion composition (containing a fluorine-based ionomer, cerium and water) utilized in the production of the electrolyte membrane has been suggested.

However, the conventional method including the above liquid impregnation may cause side effects such as swelling of the electrolyte membrane, so it is not preferable to combine this process with a roll-to-roll process involving application of a predetermined tension to the electrolyte membrane. In addition, when a cerium precursor is introduced into a liquid dispersion composition before production of the electrolyte membrane, quality uniformity of the electrolyte membrane depending on dispersibility and solubility is deteriorated and an additional process of removing nitrate, sulfate or the like is disadvantageously needed after production of the electrolyte membrane.

The above information disclosed in this Background section is provided only for enhancement of understanding of the background of the invention and therefore it may contain information that does not form the prior art that is already known in this country to a person of ordinary skill in the art.

SUMMARY OF THE INVENTION

In preferred aspects, the present invention provides a method of introducing an antioxidant into a solid electrolyte membrane without physical and/or chemical deformation and damage.

In one aspect, the present invention may provide a method of manufacturing an electrolyte membrane for fuel cells. The method may include providing a first membrane that comprises a perfluorinated sulfonic acid-based compound, providing a second membrane that comprises an antioxidant such that the second membrane contacts of at least one surface of the first membrane, and transferring the antioxidant of the second membrane to the first membrane. The method may further comprise removing the second membrane. For instance, the second membrane may suitably be removed from contacting the first membrane after transferring the antioxidant. The second membrane may suitably contact only a portion or an entirety of one surface of the first membrane. For instance, the second membrane may contact a portion of one surface of the first membrane. The second membrane contacts at least a substantial portion of one surface of the first membrane, for example at least 60, 70, 80, 90, 95 percent of the entire area of a surface of the first membrane.

The term "perfluorinated sulfonic acid-based compound" as used herein refers to a compound having one or more of sulfonic acid group or salt thereof such as —$SO_3H$ and having one or more of perfluorinated alkyl (or alkylene) chains. For example, the perfluorinated sulfonic acid-based compound may include sulfonic acid group attached to perfluorinated $C_1$-$C_{30}$ alkyl or alkylene (e.g., saturated or unsaturated), or perfluorinated 2-30 membered heteroalkyl (or heteroalkylene). Non-limiting Examples of perfluorinated sulfonic acid-based compound may include perfluorooctanesulfonic acid or tetrafluoroethylene-perfluoro-3,6-dioxa-4-methyl-7-octenesulfonic acid copolymer (Nation®, Dupont).

The term "antioxidant" as used herein refers to a molecule, compound or material that may prevent or inhibit oxidation (e.g., increasing oxidation state) of the other molecule, compound or material. The antioxidant may spontaneously be oxidized in reaction or by contact with the other molecule. Preferably, the antioxidant may include metal ion having multiple valencies and multiple oxidative states such as cerium ions, iron ions, cobalt ions, nickel ions, manganese ions, copper ions or the like. Exemplary suitable antioxidants include, for example, trivalent or tetravalent cerium ions ($Ce^{3+}$, $Ce^{4+}$), bivalent or trivalent manganese ions ($Mn^{2+}$, $Mn^{3+}$), bivalent or trivalent iron ions ($Fe^{2+}$, $Fe^{3+}$), bivalent or trivalent cobalt ions ($Co^{2+}$, $Co^{3+}$), bivalent or trivalent copper ions ($Cu^{2+}$, $Cu^{3+}$), bivalent or trivalent nickel ions ($Ni^{2+}$, $Ni^{3+}$) or combinations thereof.

The antioxidant moved or transferred to the first membrane may suitably be present on the surface and/or inside of the membrane. Preferably, the antioxidant may move along or through anion exchange functional groups (e.g., —$SO_3^-$) and may move along an ionic channel inside the membrane (e.g., PFSA ionomer), which is generally formed by hydrophilic functional groups or hydrophilic regions and thus contains water molecules therein. For example, the antioxidants transferred from the second membrane may be distributed for both surface and/or inside of the first membrane.

The second membrane may further include a substrate.

The substrate may suitably include a membrane including a perfluorinated sulfonic acid-based compound and the antioxidant may be dispersed in the membrane.

The substrate may suitably include a porous membrane. The porous membrane may suitably include a polymer material having an anionic property, carbon material and combinations thereof, and the antioxidant may be dispersed in pores of the porous membrane.

The antioxidant may be selected from the group consisting of trivalent or tetravalent cerium ions, bivalent or trivalent manganese ions and combinations thereof.

The second membrane may suitably include the antioxidant in an amount of about 1 μg/cm² to 20 μg/cm². The second membrane may suitably have a thickness of about 10 μm to 30 μm. During the transferring, vapor may be supplied to sequentially permeate through the second membrane and the first membrane, and thereby to move the antioxidant of the second membrane to the first membrane according to flow of the vapor. For instance, the transferring may be performed by supplying vapor such that the vapor sequentially permeates through the second membrane and the first membrane and the antioxidant of the second membrane moves to the first membrane according to flow of the vapor.

The vapor may have a temperature of about 75° C. to 120° C.

The vapor may be supplied in a permeation amount per area of about 5 g/cm² to 50 g/cm².

In addition, transferring or moving the antioxidant of the second membrane to the first membrane may be performed by compressing the first membrane and the second membrane, and then heating the membranes.

The first membrane and the second membrane may suitably be compressed at a pressure of about 0.1 MPa to 10 MPa. The first membrane and the second membrane may suitably be heated at a temperature of about 60° C. to 120° C. The first membrane and the second membrane may suitably be compressed and heated for about 10 seconds to 600 seconds.

In another aspect, the present invention provides a method of manufacturing a membrane-electrode assembly for fuel cells including providing an electrolyte membrane manufactured by the method as described herein, and forming a pair of electrodes on both surfaces of the electrolyte membrane.

Further provided is a fuel cell that may include an electrolyte membrane as described herein.

Still further provided is a vehicle that may include the fuel cell as described herein.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

Figure 1:
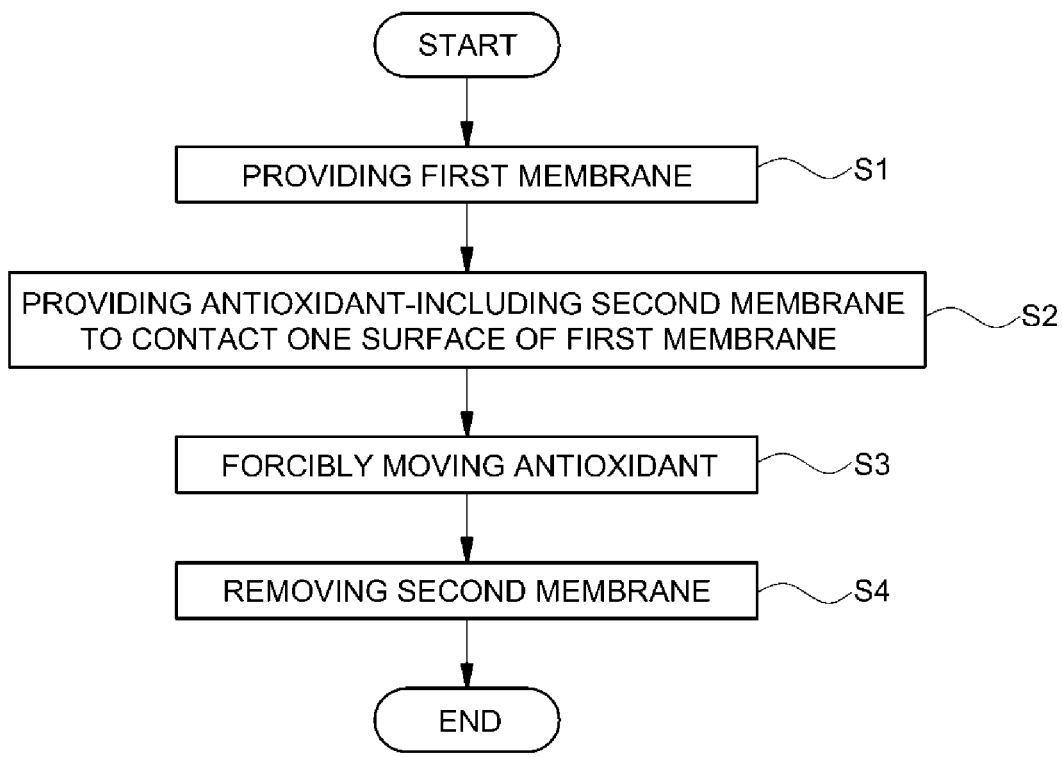
FIG. 1 schematically illustrates an exemplary method of manufacturing an electrolyte membrane for fuel cells according to an exemplary embodiment of the present invention.

The objects described above, and other objects, features and advantages will be clearly understood from the following preferred embodiments with reference to the annexed drawings. However, the present invention is not limited to the embodiments and will be embodied in different forms. The embodiments are suggested only to offer thorough and complete understanding of the disclosed contents and to sufficiently inform those skilled in the art of the technical concept of the present invention.

Like reference numbers refer to like elements throughout the description of the figures. In the drawings, the sizes of structures are exaggerated for clarity. It will be understood that, although the terms first, second, etc. may be used herein to describe various elements, these elements should not be limited by these terms and are used only to distinguish one element from another. For example, within the scope defined by the present invention, the first element may be referred to as the second element and similarly, the second element may be referred to as the first element. Singular forms are intended to include plural forms as well, unless context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless otherwise specified, all numbers, values, and/or representations that express the amounts of components, reaction conditions, polymer compositions, and mixtures used herein are taken to mean that these numbers are approximations including various uncertainties of the measurements that essentially occur in obtaining these values among others, and thus should be understood to be modified by the term "about" in all cases. Furthermore, when a numerical range is disclosed in this specification, such a range is continuous and includes all values from the minimum value of said range to the maximum value thereof, unless otherwise indicated. Moreover, when such a range refers to an integer, all integers including the minimum value to the maximum value are included unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between the valid integers within the stated range, such as 5.5, 6.5, 7.5, 5.5 to 8.5, 6.5 to 9, and the like. Also, for example, the range of "10% to 30%" will be understood to include any subranges, such as 10% to 15%, 12% to 18%, 20% to 30%, etc., as well as all integers including values of 10%, 11%, 12%, 13% and the like and up to 30%, and will also be understood to include any value between the valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Unless context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all the numbers, figures and/or expressions. In addition, when number ranges are disclosed in the description, these ranges are continuous and include all numbers from the minimum to the maximum including the maximum within the ranges unless otherwise defined. Furthermore, when the range is referred to as an integer, it includes all integers from the minimum to the maximum including the maximum within the range, unless otherwise defined.

It should be understood that, in the specification, when the range is referred to regarding a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13% as well as 30%, and any sub-ranges of 10% to 15%, 12% to 18%, or 20% to 30%, as well as any figures, such as 10.5%, 15.5% and 25.5%, between appropriate integers that fall within the range.

FIG. 1 schematically illustrates an exemplary method of manufacturing an electrolyte membrane for fuel cells according to the present invention. Referring to FIG. 1, the manufacturing method may include providing a first membrane including a perfluorinated sulfonic acid-based compound (S1), providing a second membrane including an antioxidant such that the second membrane partially or entirely contacts one surface of the first membrane (S2), transferring the antioxidant of the second membrane to the first membrane (S3) and removing the second membrane (S4). Preferably, the antioxidant in the second membrane may be transferred to the first membrane by force or by operation, e.g., using a carrier (e.g., gas or liquid carrier) or using a physical force such as applying a pressure.

The first membrane may be used as an electrolyte membrane of a membrane-electrode assembly for fuel cells and may include a perfluorinated sulfonic acid-based compound. Preferably, the first membrane may include a fluorine-based polymer compound having a sulfonic acid group at an end thereof, for example, NAFION® (Dupont).

Figure 2A:
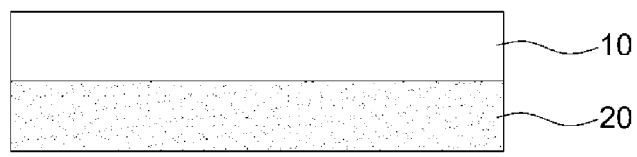
FIG. 2A shows that an exemplary second membrane is provided to the first membrane such that the second membrane and the first membrane are in contact in substantial area.

Then, as shown in FIG. 2A, the antioxidant-including second membrane 20 may be provided to contact a surface of the first membrane 10 (S2). In certain preferred embodiments, the second membrane 20 may contact one surface of the first membrane. The second membrane 20 may partially or entirely contact one surface of the first membrane. For example, the second membrane 20 may contact about 5% or greater, about 10% or greater, about 20% or greater, about 30% or greater, about 40% or greater, about 50% or greater, about 60% or greater, about 70% or greater, about 80% or greater, about 90% or greater, about 95% or greater, about 99% or greater, or 100% of the surface area of the first membrane.

Preferably, the first membrane 10 may be a component of the electrolyte membrane of the membrane-electrode assembly for fuel cells. Preferably, the second membrane 20 may be a separate component from the first membrane 10 and may be disposed to contact each other. In particular, the antioxidant of the second membrane 20 may be then moved or transferred to the first membrane 10 by a certain process.

Figure 2B:
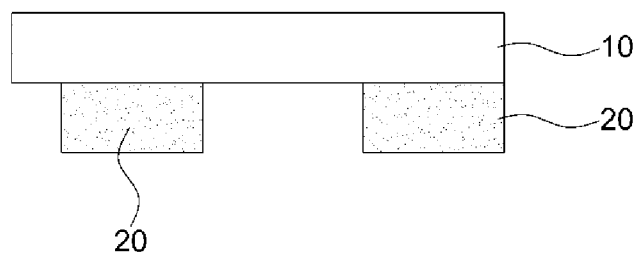
FIG. 2B shows that an exemplary e second membrane is provided to the first membrane such that the second membrane and the first membrane are in contact in specific area.

As shown in FIG. 2A, the second membrane 20 may be provided to contact the entirety of one surface of the first membrane 10, or as shown in FIG. 2B, the second membrane 20 may be provided to partially contact one surface of the first membrane 10. When the second membrane 20 is provided to contact only a part of one surface of the first membrane 10, as shown in FIG. 2B, the antioxidant may be moved only to an area where the first membrane 10 makes contact with the second membrane 20, or a periphery adjacent thereto or margin around the contacting surface. For convenience, a case where the second membrane 20 may be provided to contact only a part of one surface of the first membrane 10, as shown in FIG. 2A, is described.

The second membrane may include a substrate and an antioxidant.

The substrate may be same to or different from the first membrane. For example, the substrate suitably used for the second membrane may be a thin film which may include a perfluorinated sulfonic acid-based compound. Alternatively, the substrate may be a porous membrane including a polymer material having an anionic property.

When the substrate is a thin film including a perfluorinated sulfonic acid-based compound, the antioxidant may be dispersed in the thin film. For example, a liquid dispersion including a perfluorinated sulfonic acid-based compound, an antioxidant and an alcohol-based solvent may be prepared and may be then converted into a film by a method such as casting. Preferably, the second membrane may include the antioxidant homogeneously dispersed in the thin film, or in the polymer of the thin film.

When the substrate is a porous membrane, the antioxidant may be dispersed in pores of the membrane. The porous membrane may be a polymer material membrane selected from the group consisting of polypropylene oxide, polystyrene, polyarylene ether, polyimide and combinations thereof. Preferably, the polymer material may have a functional group such as a sulfonic acid group ($—SO_3H$), a phosphoric acid group ($—PO_4H_3$) or a carboxylic group ($—COOH$). For example, the second membrane including an antioxidant in the pores thereof may be obtained by immersing the porous membrane in a solution containing an antioxidant.

The antioxidant may include one or more trivalent or tetravalent cerium ions ($Ce^{3+}$, $Ce^{4+}$), bivalent or trivalent manganese ions ($Mn^{2+}$, $Mn^{3+}$) and combinations thereof.

The second membrane may include the antioxidant in an amount of about 1 μg/cm$^2$ or greater. When the content of the antioxidant is less than about 1 μg/cm$^2$, the amount of antioxidant moved to the first membrane may not be sufficient. Preferably, the content of the antioxidant may be about 20 μg/cm$^2$ or less, although there is no specific limitation as to the upper limit of the content of the antioxidant. The content of antioxidant included in the second membrane is expressed in grams per unit area, not grams per unit volume, because the thickness of the second membrane is considerably small compared to the area thereof.

The thickness of the second membrane may be about 10 μm or greater. When the thickness is less than about 10 μm, the second membrane may not sufficiently include the antioxidant. Preferably, the thickness of the second membrane may be about 30 μm or less, although there is no specific limitation as to the upper limit of the content of the antioxidant.

Moving or transferring the antioxidant of the second membrane to the first membrane (S3) may be performed on composite including the second membrane and the first membrane as those membranes contact to each other, shown in FIG. 2A, for example, using a certain operation. Here, the term "forcibly moving" or "operation" as used herein mean moving the antioxidant of the second membrane to the first membrane along an unusual route under a predetermined or specific condition or state.

Figure 3:
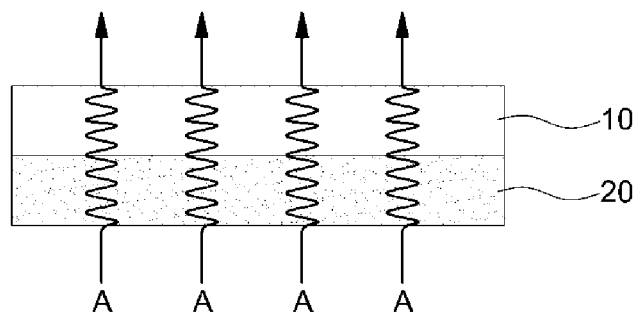
FIG. 3 illustrates an exemplary method where water vapor (A) permeates membranes for moving an antioxidant.

An exemplary process of the forcibly moving of the antioxidant (S3) is shown in FIG. 3.

According to an exemplary embodiment of the present invention as shown in FIG. 3, vapor may flow to sequentially permeate through the second membrane 20 and the first membrane 10, and thereby moving or transferring the antioxidant of the second membrane 20 to the first membrane 10 according to flow (A) of the vapor. Preferably the vapor may carry the antioxidant, for example, physically enforcing to move or pushing, or by chemically interacting or dragging, so the antioxidant can move according to the flow (A) of the vapor.

For example, as shown in FIG. 3, the vapor may be supplied or be injected into one open surface of the second membrane 20 and to be discharged into another open surface of the first membrane 10.

A method of supplying the vapor as used herein is not particularly limited. For example, water vapor may be supplied by locating the first membrane and the second membrane in an upper part and a lower part, respectively, folding the first membrane with the second membrane, and sealing an inlet of a glass bottle containing water with the folded first and second membranes. At this time, space between the first membrane and the second membrane when these membranes contact to each other may be removed and make air-tight contact therebetween. For instance, when the glass bottle is put in an oven and is kept at a constant temperature of about 100° C., water vapor is produced and passes through the second membrane and then the first membrane. As the water vapor permeates the membranes, the antioxidant present in the second membrane can be moved to the first membrane.

The vapor may be water vapor, or steam, but the present invention is not limited thereto. Any vapor may be used so long as it is capable of dissolving the antioxidant or chemically interacting with the antioxidant, while not reacting with components for the first and second membranes.

The vapor may have a temperature of about 75° C. to 120° C. When it is difficult to control the temperature of vapor, the temperature of the surrounding environment of the composite of the first membrane and the second membrane that vapor permeates may be controlled to be at a temperature of about 75° C. to 120° C. When the temperature is less than about 75° C., movement of antioxidant through vapor may not occur, and when the temperature is greater than about 120° C., the first membrane and second membrane may be thermally degraded.

The vapor may be supplied in an amount of about 5 g/cm$^2$ or greater. When the amount per unit area is less than about 5 g/cm², the vapor may not be sufficient for moving the antioxidant. Preferably, the vapor may be supplied in an amount of 50 g/cm² or less, however, the upper limit may not be particularly limited. In this case, the amount of permeated vapor may be expressed as amount of permeated vapor per area, not per volume, because the thicknesses of the first membrane and the second membrane are very thin compared to the area of injected vapor.

Figure 4:
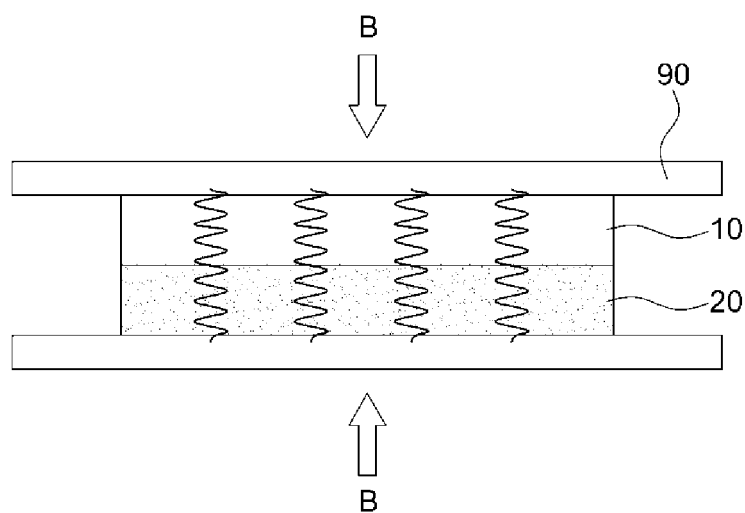
FIG. 4 illustrates an exemplary method where thermal compression (B) is applied for moving an antioxidant.

In an exemplary embodiment of the present invention, the antioxidant (S3) may be forcibly moved as shown in FIG. 4.

The first membrane 10 and the second membrane 20 may be compressed by a certain pressure (B) and the antioxidant of the second membrane 20 may be then moved to the first membrane 10 by application of heat (C).

This uses the feature that the mobility of antioxidant is increased by applying pressure and heat to the antioxidant. As the mobility of antioxidant increases, depending on concentration gradient of the antioxidant, the antioxidant may be moved from the second membrane 20 with a high concentration of antioxidant to the first membrane 10 with less or no antioxidant.

There is no particular limitation as to the method of supplying pressure and heat to the first membrane 10 and the second membrane 20. For example, a hot pressing machine 90 may suitably be used, as shown in FIG. 4.

The first membrane and the second membrane may be compressed by applying a pressure of about 0.1 MPa to 10 MPa thereto. When the pressure is less than about 0.1 MPa, movement of the antioxidant may not be sufficient. On the other hand, when the pressure is greater than about 10 MPa, the first membrane and the second membrane may be physically damaged.

Heat at a temperature of about 60° C. to 120° C. may be applied to the first membrane and the second membrane. When the temperature is less than about 60° C., the effect of increasing the mobility of the antioxidant may not be sufficient and the antioxidant may be not moved, and when the temperature is greater than about 120° C., the first membrane and the second membrane may be thermally decomposed.

The first membrane and the second membrane may be compressed and heated for about 10 seconds to 600 seconds. When the time for this operation is less than about 10 seconds, the antioxidant of the second membrane may not be sufficiently moved to the first membrane, and when the time is greater than about 600 seconds, the first membrane and the second membrane may be thermally decomposed and the process time may be excessively long.

Figure 5:
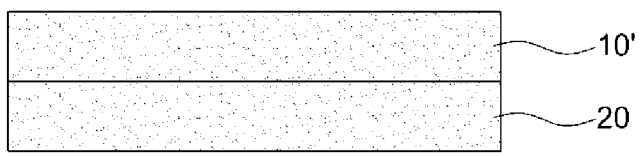
FIG. 5 shows that an antioxidant moves from the second membrane to the first membrane during forming a complex.

When water vapor is supplied to the composite of the first membrane and the second membrane to allow the water vapor to permeate the membranes, or pressure and heat are applied thereto, the antioxidant of the second membrane is moved to the first membrane. As shown in FIG. 5, the first membrane 10' including the antioxidant can be obtained. The antioxidant may be moved through proton-conducting channels by sulfonic acid groups contained in the first membrane, and a part or entirety thereof may be fixed to the first membrane.

Figure 6:
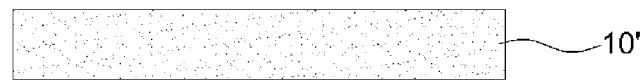
FIG. 6 shows that the second membrane of FIG. 5 is removed.

Then, when the second membrane 20 is removed (S4), the first membrane 10' including an antioxidant shown in FIG. 6, thereby obtaining electrolyte membrane for fuel cells.

The electrolyte membrane for fuel cells according to the present invention may be obtained without deformation or damage during introduction of an antioxidant, unlike a conventional case, and thus physical durability thereof may not be deteriorated.

The method of manufacturing a membrane-electrode assembly for fuel cells according to the present invention may include providing the electrolyte membrane manufactured by the aforementioned method, and forming a pair of electrodes on both surfaces of the electrolyte membrane.

For example, the pair of electrodes may include an anode and a cathode, and a formation method thereof may include, for example, coating using release paper, although there is no particular limitation as to the formation method.

Figure 7:
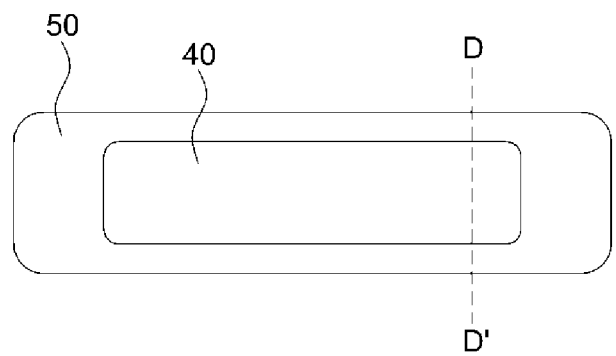
FIG. 7 shows an exemplary membrane-electrode assembly for fuel cells according to an exemplary embodiment of the present invention.
Figure 8:
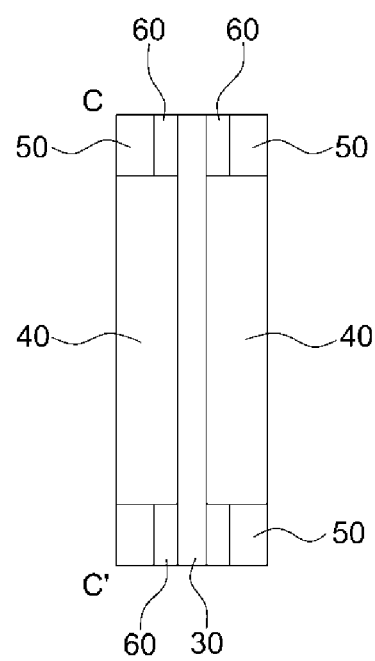
FIG. 8 is a cross-sectional view taken along line D-D' of FIG. 7.

Meanwhile, FIG. 7 shows a modification example of a membrane-electrode assembly for fuel cells according to the present invention and FIG. 8 is a cross-sectional view taken along line D-D' of FIG. 7.

For example, as shown in FIG. 7, the membrane-electrode assembly may include an electrolyte membrane 30, a pair of electrodes 40 formed on both surfaces of the electrolyte membrane, a sub-gasket 50 disposed on the electrolyte membrane 30 while contacting peripheral surfaces of the electrodes 40, and an adhesion part 60 interposed between the sub-gasket 50 and the electrolyte membrane 30 to adhere the sub-gasket 50 to the electrolyte membrane 30.

Here, when the adhesion part 60 is an adhesive film or layer containing an antioxidant, vapor may be supplied to permeate through the adhesion part 60 and the electrolyte membrane 30 sequentially, or the adhesion part 60 and the electrolyte membrane 30 may be simultaneously compressed and heated, so that the antioxidant of the adhesion part 60 may be moved to and fixed on the electrolyte membrane 30.

As a result, by adhesion of a sub-gasket, the antioxidant can be introduced into an edge of an electrolyte membrane, which is not used in electrochemical reaction and is removed. The antioxidant introduced into this part gradually may diffuse into an active part (part used for the electrochemical reaction) by humidity and heat supplied during operation of a fuel cell. As a result, deterioration in performance of the membrane-electrode assembly may be prevented and chemical durability is not deteriorated.

EXAMPLE

Hereinafter, the present invention will be described in more detail with reference to specific examples. The following examples are provided only for better understanding of the present invention and should be construed as limiting the scope of the present invention.

Example 1—Water Vapor Permeation (S1) The first membrane (Nafion 212® DuPont, USA) was prepared.

(S2) The second membrane containing 17 μg/cm² of cerium ions as an antioxidant and having a thickness of 18 μm was prepared. Specifically, a perfluorinated sulfonic acid-based ionomer dispersion (Nafion® D2021 dispersion, DuPont, USA) was mixed with cerium ions to form a film. The second membrane was provided such that it contacted a part of one surface of the first membrane.

(S3) Vapor was provided such that it passed through the second membrane and then the first membrane. Specifically, 50 g of water vapor was supplied per 5.3 cm² of an area where the first membrane contacted the second membrane. The amount of water vapor permeated per area was 9.4 g/cm². The temperature of water vapor was 80° C.

(S4) The second membrane was removed to obtain an electrolyte membrane for fuel cells.

The concentration of cerium ions in the electrolyte membrane for fuel cells was measured using X-ray fluorescence spectrometry (XRF). Results are shown in Table 1 below.

TABLE 1

| Item | Concentration of cerium ion [µg/cm$^2$] |
|---|---|
| Before vapor permeation | 0 |
| After vapor permeation | 9.0 |

As can be seen from Table 1, before permeation of vapor, cerium ions were not present in the first membrane, and after adhesion of the second membrane to the first membrane and permeation of vapor, an amount of about 9.0 µg/cm$^2$ of cerium ions were present in the first membrane.

Example 2—Thermal Compression

The same processes as in (S1) and (S2) of Example 1 were conducted.

(S3) The composite of the first membrane and the second membrane was compressed at a pressure of 1 MPa and then heated under the conditions shown in Table 2 below. To specify temperature conditions, Comparative Example was conducted and results are shown in the following Table 2.

(S4) The second membrane was removed to obtain an electrolyte membrane for fuel cells.

TABLE 2

| Items | Temperature [° C.] | Time [sec] |
|---|---|---|
| Comparative Example1 | 40 | 60 |
| Example 2-1 | 60 | |
| Example 2-2 | 80 | |
| Example 2-3 | 100 | |
| Example 2-4 | 120 | |
| Comparative Example 2 | 40 | 120 |
| Example 2-5 | 60 | |
| Example 2-6 | 80 | |
| Example 2-7 | 100 | |
| Example 2-8 | 120 | |

Concentrations of cerium ions of electrolyte membranes for fuel cells according to Examples 2-1 to 2-8, and Comparative Examples 1 and 2 were measured by X-ray fluorescence spectrometry (XRF). The measured concentration of cerium ions was calculated as a proportion based on the initial concentration of cerium ions in the second membrane and results are shown in FIG. 9.

Figure 9:
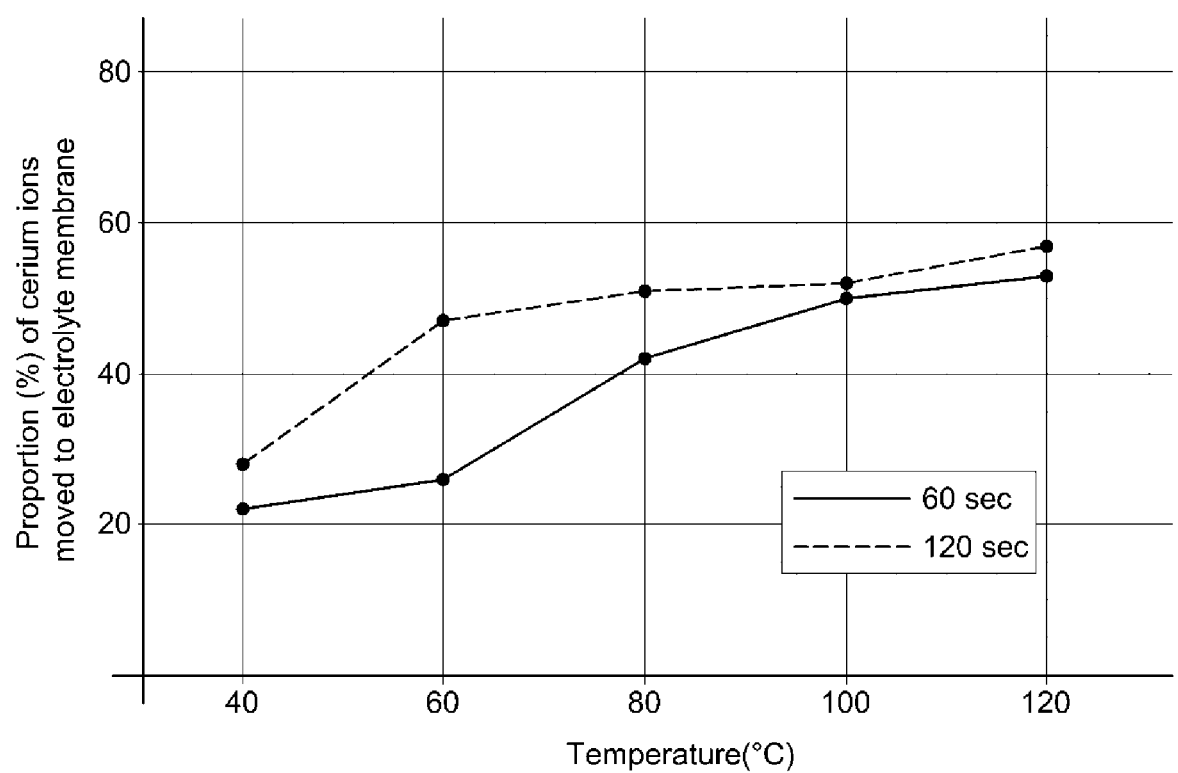
FIG. 9 shows a measurement result of proportion (%) of cerium ions moved to an exemplary electrolyte membrane in Example 2 according to an exemplary embodiment of the present invention.

As can be seen from FIG. 9, as temperature and time increase, the amount (in percentage) of cerium ions moved from the second membrane to the first membrane (electrolyte membrane) increases.

According to various exemplary embodiments of the present invention, an antioxidant can be introduced into the electrolyte membranes without physical and/or chemical deformation and damage of solid-phase electrolyte membranes.

In addition, in the process of introducing an antioxidant according to the present invention, electrolyte membranes may neither be deformed nor damaged, and physical durability thereof may not deteriorated.

In addition, according to the present invention, by controlling the location where the second membrane is adhered to the first membrane, the antioxidant can be selectively introduced only to the desired predetermined area of the electrolyte membranes, or it can be effectively introduced to the entire area of the electrolyte membranes as well.

In addition, according to the present invention, a sub-gasket film or adhesive, into which an antioxidant is introduced, can be used as the second membrane. As a result, the antioxidant can be introduced into a certain part of the electrolyte membrane, which is removed without being used for electrochemical reaction, by adhesion of the sub-gasket. The antioxidant introduced to this part gradually diffuses into an active part (part used for the electrochemical reaction) by humidity and heat supplied during operation of a fuel cell. As a result, deterioration in performance of the membrane-electrode assembly may be prevented and chemical durability is not deteriorated.

The effects of the present invention are not limited to those mentioned above. It should be understood that the effects of the present invention include all effects that can be inferred from the foregoing description of the present invention.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing an electrolyte membrane for fuel cells comprising:
providing a first membrane comprising a perfluorinated sulfonic acid-based compound;
providing a second membrane comprising an antioxidant such that the second membrane contacts a surface of the first membrane;
transferring the antioxidant of the second membrane to the first membrane,
wherein the second membrane is removed from contacting the first membrane after transferring the antioxidant.

2. The method of claim 1, wherein the second membrane contacts a portion of one surface of the first membrane.

3. The method of claim 1, wherein the second membrane contacts at least a substantial portion of one surface of the first membrane.

4. The method according to claim 1, wherein the second membrane further comprises a substrate.

5. The method according to claim 1, wherein the substrate comprises a membrane comprising a perfluorinated sulfonic acid-based compound and the antioxidant is dispersed in the membrane.

6. The method according to claim 1, wherein the substrate comprising a porous membrane comprising a polymer material having an anionic property and the antioxidant is dispersed in pores of the porous membrane.

7. The method according to claim 1, wherein the antioxidant is selected from the group consisting of trivalent or tetravalent cerium ions, bivalent or trivalent manganese ions and combinations thereof.

8. The method according to claim 1, wherein the second membrane comprises the antioxidant in an amount of 1 µg/cm$^2$ to 20 µg/cm$^2$.

9. The method according to claim 1, wherein the second membrane has a thickness of 10 µm to 30 µm.

10. The method according to claim 1, wherein the transferring is performed by supplying vapor such that the vapor sequentially permeates through the second membrane and the first membrane and the antioxidant of the second membrane moves to the first membrane according to flow of the vapor.

11. The method according to claim 7, wherein the vapor has a temperature of about 75° C. to 120° C.

12. The method according to claim 7, wherein the vapor is supplied in a permeation amount per area of 5 g/cm² to 50 g/cm².

13. The method according to claim 1, wherein the transferring is performed by compressing the first membrane and the second membrane, and then heating the first membrane and the second membrane.

14. The method according to claim 10, wherein the first membrane and the second membrane are compressed at a pressure of about 0.1 MPa to 10 MPa.

15. The method according to claim 10, wherein the first membrane and the second membrane are heated at a temperature of about 60° C. to 120° C.

16. The method according to claim 10, wherein the first membrane and the second membrane are compressed and heated for about 10 seconds to 600 seconds.

17. A method of manufacturing a membrane-electrode assembly for fuel cells comprising:
   providing an electrolyte membrane manufactured by the method according to claim 1; and
   forming a pair of electrodes on both surfaces of the electrolyte membrane.

18. An electrolyte membrane manufactured by the method according to claim 1.

19. A vehicle comprising a fuel cell comprising the electrolyte membrane according to claim 18.

* * * * *